(12) United States Patent
Zeng et al.

(10) Patent No.: US 7,158,631 B2
(45) Date of Patent: Jan. 2, 2007

(54) EFFICIENT ECHO CANCELLATION TECHNIQUES

(75) Inventors: Huaiyu Zeng, Red Bank, NJ (US); Chunming Han, Manalapan, NJ (US)

(73) Assignee: Intel Corporation, Santa Clara, CA (US)

(*) Notice: Subject to any disclaimer, the term of this patent is extended or adjusted under 35 U.S.C. 154(b) by 891 days.

(21) Appl. No.: 10/284,724

(22) Filed: Oct. 30, 2002

(65) Prior Publication Data
US 2004/0086133 A1 May 6, 2004

(51) Int. Cl.
*H04M 1/00* (2006.01)

(52) U.S. Cl. .......................... 379/406.08; 379/406.06; 379/406.01

(58) Field of Classification Search ........... 379/406.01, 379/406.06, 46.08, 406.11
See application file for complete search history.

(56) References Cited

U.S. PATENT DOCUMENTS

2003/0215086 A1* 11/2003 Wu et al. .............. 379/406.01

* cited by examiner

*Primary Examiner*—Jefferey F. Harold
(74) *Attorney, Agent, or Firm*—Glen B. Choi

(57) ABSTRACT

Techniques to cancel echo utilizing reduced die space and reduced usage of a time shared processor.

37 Claims, 6 Drawing Sheets

EFFICIENT ECHO CANCELLATION TECHNIQUES

FIELD OF THE INVENTION

This invention generally relates to techniques for reducing echo in communication systems.

DESCRIPTION OF RELATED ART

In many communications systems, transmission of signals between transmitter and receiver pairs generates noise arising from transmitted signal reflection (so called "echo"). Echo may corrupt the quality of the signal transmitted by the remote transmitter so that a receiver may not be able to accurately reproduce the transmitted signal. For example, FIG. 1A depicts a plot of noise resulting from an impulse signal. The noise signal shown in FIG. 1A includes "body" and "tail" portions.

FIG. 1B depicts in block diagram format a prior art echo canceller. The echo canceller may include echo canceller 110 (EC0) and echo canceller (EC1) 120. The echo canceller may reduce echo in a received signal for echo arising from a transmitted signal (the transmitted signal is depicted as s(nT)). For phases of nT (where T is the symbol interval and n is an integer from 0 to infinity), EC0 110 may reduce body and tail echo in a received signal (the received signal is depicted as r(nT)), where the echo arises in part from the transmitted signal s(nT). Signal x(nT) may represent an echo reduced version of the signal from the remote transceiver for phases of nT. Similarly, for phases of nT+T/2, EC1 120 may reduce body and tail echo in a received signal (the received signal is depicted as r(nT+T/2)), where the echo arises in part from the transmitted signal s(nT). Signal x(nT+T/2) represents an echo reduced version of the signal from the remote transceiver for phases of nT+T/2.

EC0 110 and EC1 120 may be implemented as finite impulse response (FIR) filters. The number of filter taps utilized by FIR filters may correlate to the duration of echo. In implemented echo canceller devices, there is typically a correlation between utilized silicon die area and number of filter taps. It is desirable to minimize utilized silicon die area without reducing the duration of echo cancelled.

BRIEF DESCRIPTION OF THE DRAWINGS

Note that use of the same reference numbers in different figures indicates the like elements.

DETAILED DESCRIPTION

Figure 2A:
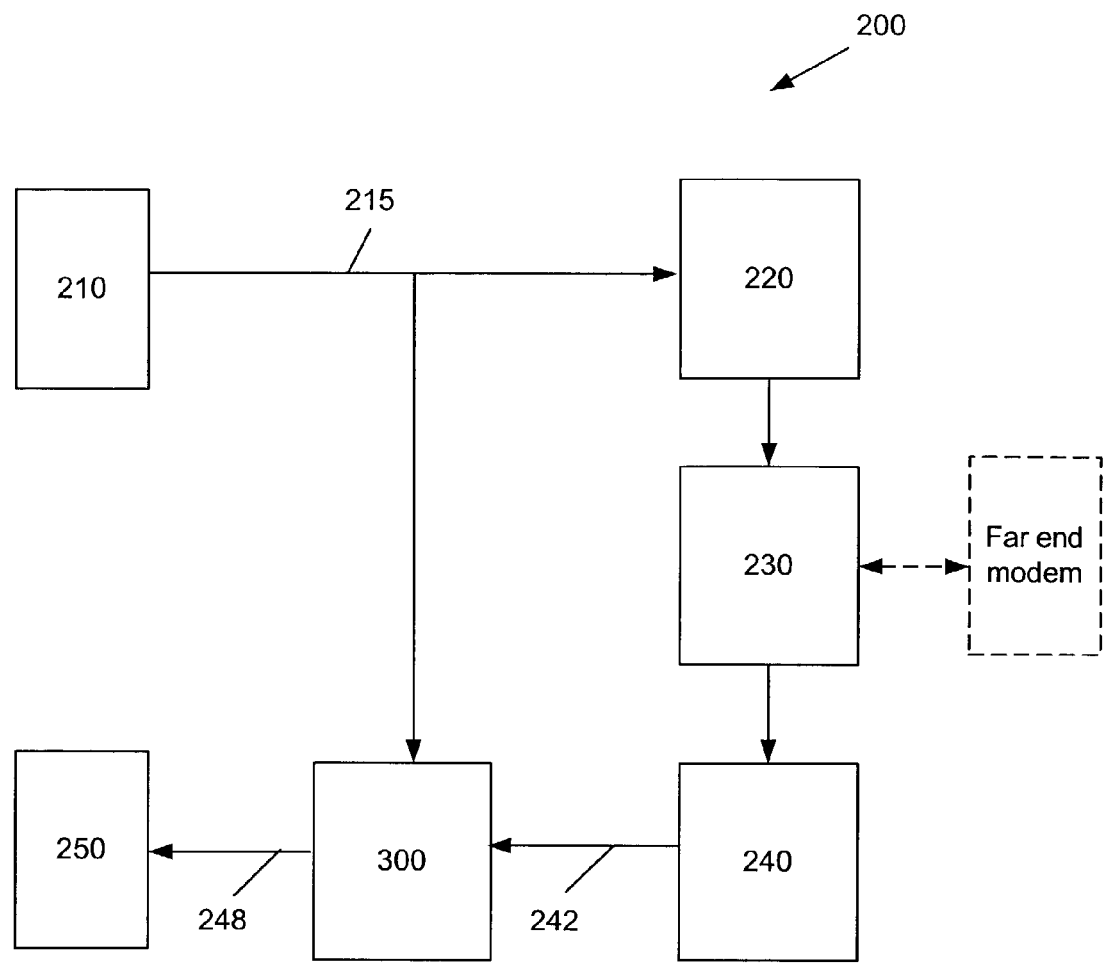
FIGS. 2A and 2B depict in block diagram form example systems in which some embodiments of the present invention may be used.

FIG. 2A depicts in block diagram form an example of a system 200 in which some embodiments of the present invention may be used. For example, system 200 may be a digital subscriber line (DSL) modem. For a description of DSL modems, see for example, Thomas Starr, "Understanding Digital Subscriber Line Technology", 1999 and ITU-T G.991.2 (G.shdsl). Scrambler/encoder/modulator 210 may perform scrambling, modulation, and/or 2B1Q encoding on a signal to be transmitted to a far-end modem (e.g., a far-end DSL modem) and provide the processed signal to coder/filter 220 and echo canceller 300. Coder/filter 220 may for example perform digital-to-analog conversion, filtering, and/or rate conversion operations. Coder/filter 220 may provide the processed signal to signal gate 230. Signal gate 230 may transmit the processed signal from coder/filter 220. Further, signal gate 230 may provide signals from a far-end modem to front end device 240. Signal gate 230 may transmit and receive signals to and from a far-end modem using, for example, a twisted pair telephone line, an antenna, coaxial and/or parallel cable.

Front end device 240 may perform analog-to-digital conversion, rate conversion, and/or filtering on the signals received from a far-end modem. Hereafter "received signal 242" may refer to a signal provided by front end device 240 to echo canceller 300. Received signal 242 may include signals received from a far-end modem as well as noise. Echo canceller 300 may reduce echo-related noise in received signal 242. Echo canceller 300 may provide an echo reduced version of received signal 242 to decoder 250 (such echo reduced version of received signal 242 is depicted as echo reduced signal 248). Decoder 250 may perform decision feedback equalization, 2B1Q decoding and/or descrambling on echo reduced signal 248.

While a DSL modem is shown as a suitable system in which echo canceller 300 may be used, the echo canceller 300 may be used to reduce echo tail by other modems such as ITU V.90 compliant modems, voice band modems, duplex modems, wireless modems, or other devices in which echo may arise.

Figure 2B:
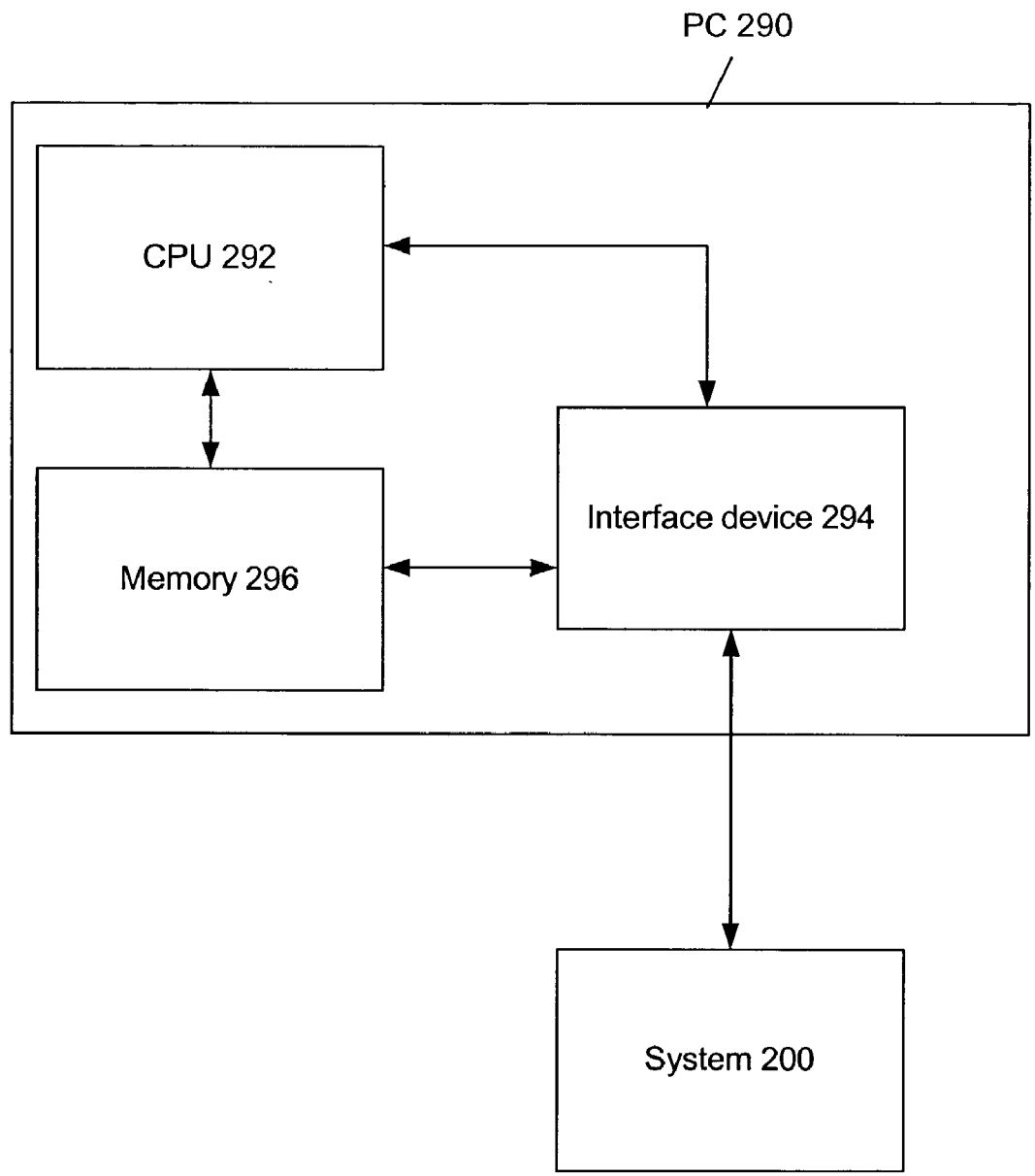

System 200 can be coupled for use with a personal computer (PC). FIG. 2B depicts an example system showing a system 200 and PC 290. PC 290 may include a central processing unit (CPU) 292, input/output (I/O) interface device 294, and memory 296. System 200 may communicate with interface device 294 using a coaxial, parallel, serial cable, or wireless connection and utilize the Peripheral Component Interconnect (PCI), Universal Serial Bus (USB), Ethernet (IEEE 802.3), IEEE 1394, and/or other communications standards.

Figure 3A:
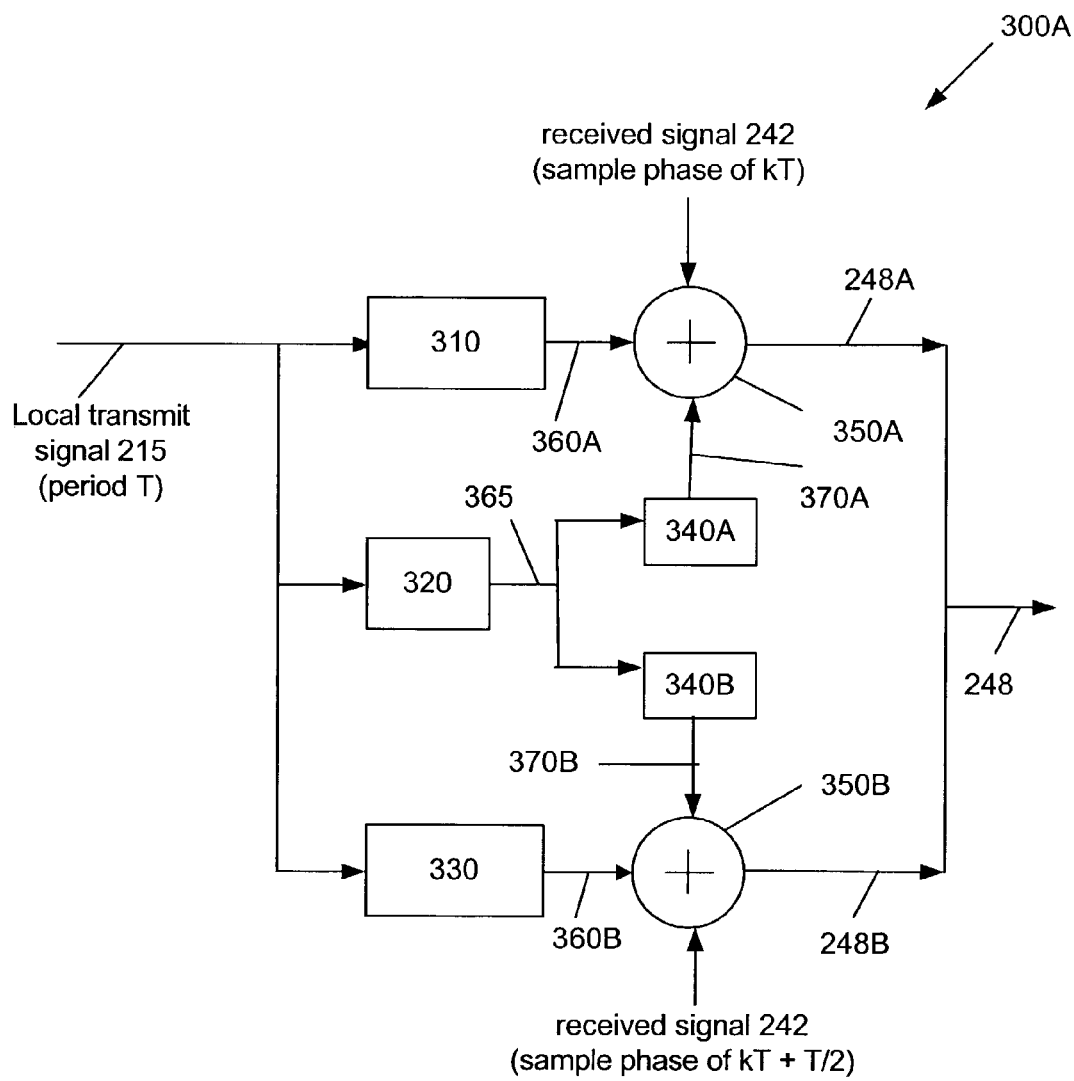
FIG. 3A depicts in block diagram form an echo canceller, in accordance embodiment of the present invention.

FIG. 3A depicts in block diagram form an echo canceller 300A, in accordance with an embodiment of the present invention. Echo canceller 300A may include a first body echo canceller (EC0") 310, tail echo canceller (ECb) 320, second body echo canceller (EC1") 330, interpolators 340A and 340B, and summers 350A and 350B. Echo canceller 300A may be implemented, in whole or in part, as software executed by a digital signal processor or a central processing unit (CPU) for example as used by a modem or personal computer. Echo canceller 300A may be implemented, in whole or in part, as firmware, an application specific integrated circuit (ASIC), and/or a field programmable gate array (FPGA).

EC0" 310 and EC1" 330 may generate respective body echo cancellation signals 360A and 360B to reduce body noise in a received signal (e.g., received signal 242). Echo cancellation signals 360A and 360B may have respective phases of kT and kT+T/2, where T is the symbol interval and k is an integer from 0 to infinity. In some implementations, when one twisted pair wire is used to receive and transmit signals, transmit signal 215 may introduce echo noise into received signal 242. Body echo cancellation signals 360A and 360B may remove from received signal 242 echo body noise attributable to transmit signal 215.

In one embodiment, EC0" 310 and EC1" 330 may be implemented as adaptive multiple tap digital finite impulse response (FIR) filters. For example, Proakis, "Digital Signal Processing", Macmillan, $2^{nd}$ Ed. (1992) describes several implementation schemes for implementing an FIR filter. For example, an N-tap FIR filter may have an output described by: y(n) =h(0)*x(n) + h(1)*x(n−1) + h(2)*x(n−2) + . . . h(N+1)*x(n−N−1), where x(n−k) represents coefficients of an input signal and h(k) represents tap coefficients, where k =0 to N+1. A Z-transform of such N-tap FIR filter may be described as:

$$H(z) = \sum_{n=0}^{N-1} h(n)z^{-n}$$

In some embodiments, EC0" 310 and EC1" 330 may determine tap coefficients (e.g., h(k)) during half-duplex mode (e.g., when only the modem that uses echo canceller 300A is scheduled to transmit signals). One such half-duplex period for DSL communication systems, defined by ITU-T G.991.2 (G.shdsl), is in "activation" mode. Thereafter, EC0" 310 and EC1" 330 may determine tap coefficients adaptively.

In some embodiments, the number of taps in EC0" 310 and EC1" 330 may correlate to a sampling time of echo. For example, when EC0" 310 and EC1" 330 sample only a body portion of echo, the number of taps utilized by EC0" 310 and EC1" 330 may correlate to a duration of echo body.

ECb 320 may generate tail echo cancellation signal 365 to reduce tail noise among received signal 242. For example, tail echo cancellation signal 365 may reduce echo tail noise attributable to transmit signal 215 from received signal 242. For example, ECb 320 may generate tail echo cancellation signal 365 having phases of kT+T/X, where T/X may be between T and T/2. In one implementation, X may be 4 (although other values of X may be used). For example, sample phases of tail echo cancellation signal 365 may be between the sample phases of body echo cancellation signals 360A and 360B.

ECb 320 may provide a tail echo cancellation signal 365 (having phases of kT + T/X) to interpolators 340A and 340B. Interpolator 340A may perform linear interpolations based upon tail echo cancellation signal 365 to determine and output a tail echo cancellation signal 370A having phases of kT. Interpolator 340B may perform linear interpolations to determine and output a tail echo cancellation signal 370B having phases of kT + T/2. For example, in some implementations, interpolators 340A and 340B may use the following relationship to determine respective tail echo cancellation signals 370A and 370B:

Sample(x)*W +sample(x+1)*(1−W)

where

Sample(x) is a sample of tail echo cancellation signal 365; and

Sample(x+1) is a next consecutive sample of tail echo cancellation signal 365 following sample(x).

For interpolator 340A, variable W may be 0.25 although other values may be chosen. For interpolator 340B, variable W may be 0.75 although other values may be chosen. In some embodiments, interpolators 340A and 340B may be implemented as linear FIR filters each having two or more taps although other linear averaging devices may be used.

Interpolator 340A may provide tail echo cancellation signal 370A to summer 350A. Interpolator 340B may provide tail echo cancellation signal 370B to summer 350B.

To remove a body portion of echo noise attributable to transmit signal 215, EC0" 310 and EC1" 330 may delay output of body echo cancellation signals 360A and 360B to respective summers 350A and 350B so that, in the time domain, body echo cancellation signals 360A and 360B are applied to the received signal 242 to cancel body echo noise attributable to the related portion of transmit signal 215. Similarly, to remove a tail portion of echo noise attributable to transmit signal 215, interpolators 340A and 340B may delay output of respective tail echo cancellation signals 370A and 370B to respective summers 350A and 350B so that, in the time domain, tail echo cancellation signals 370A and 370B are applied to the received signal 242 to cancel tail echo noise attributable to the related portion of transmit signal 215.

For phases of kT, summer 350A may (1) subtract body echo cancellation signal 360A and tail echo cancellation signal 370A from received signal 242 and (2) provide the result as signal 248A. For phases of kT + T/2, summer 350B may (1) subtract body echo cancellation signal 360B and tail echo cancellation signal 370B from received signal 242 and (2) provide the result as signal 248B. Signals 248A and 248B together combine to form echo reduced signal 248.

Figure 1A:
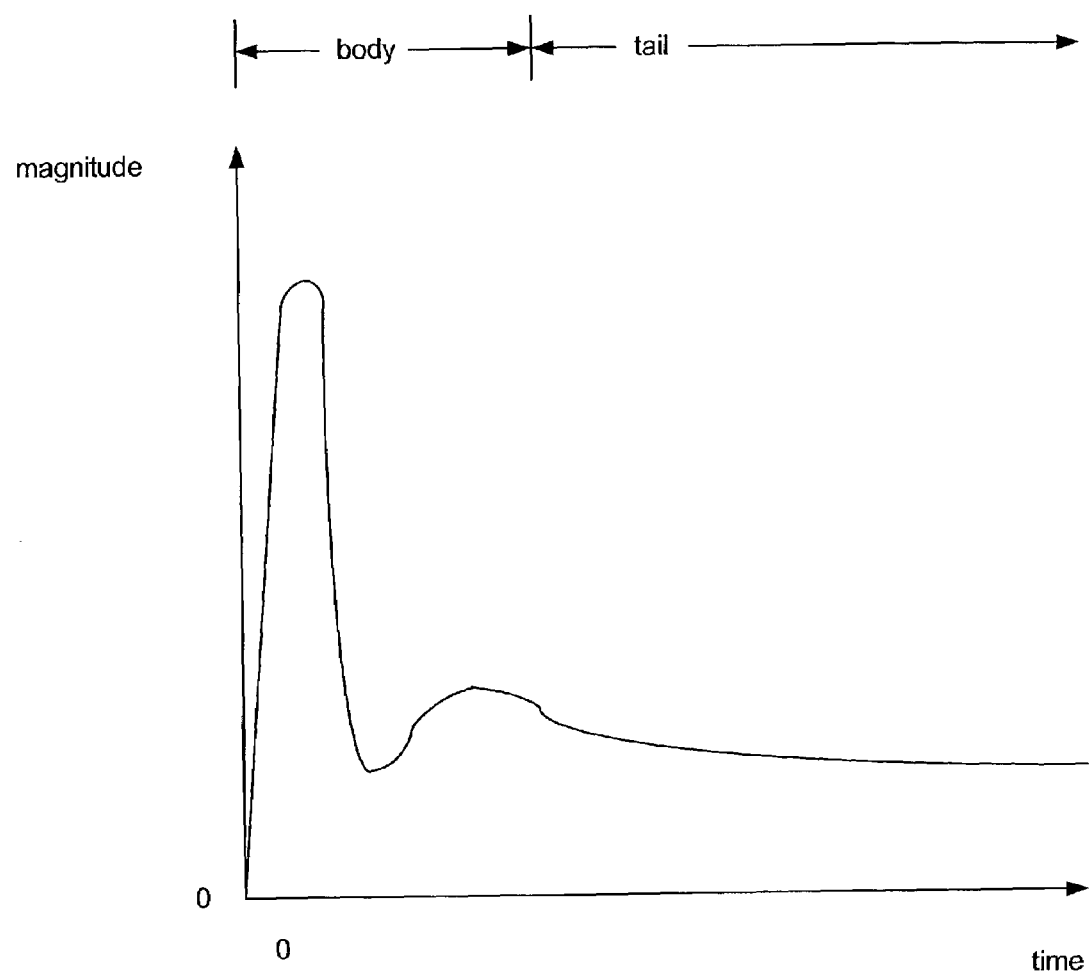
FIG. 1A depicts a plot of a combination of "body" and "tail" components of noise resulting from an impulse signal.
Figure 1B:
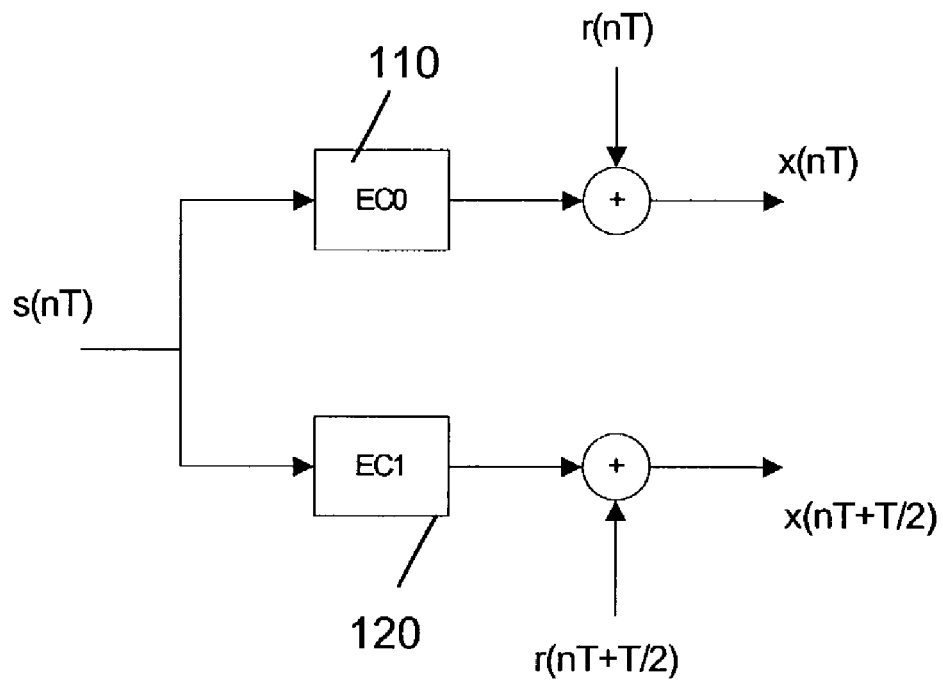
FIG. 1B depicts in block diagram format a prior art echo canceller.

For example, for echo that includes a body portion having a duration of 1 microsecond and a tail having a duration of 3 microseconds, each of EC0 110 and EC1 120 of the echo canceller of FIG. 1B may sample echo for 4 microseconds. By contrast, for echo canceller 300A, each of EC0" 310 and EC1" 330 may sample the body portions of echo (e.g., 1 microsecond) whereas ECb 320 may sample the tail portion of echo (e.g., 3 microseconds). Cumulatively, echo canceller 300A may sample echo for 5 microseconds, whereas the echo canceller of FIG. 1B may sample echo for 8 microseconds. In some embodiments of the present invention, when FIR filters are used, the number of taps of FIR filters used in the echo canceller of FIG. 1B and echo canceller 300A may be proportional to the time in which an FIR filter samples echo. Accordingly, the echo canceller 300A may use less taps than the echo canceller of FIG. 1B. By using less filter taps, echo canceller 300A may thereby use less die space than the echo canceller described with respect to FIG. 1B.

Figure 3B:
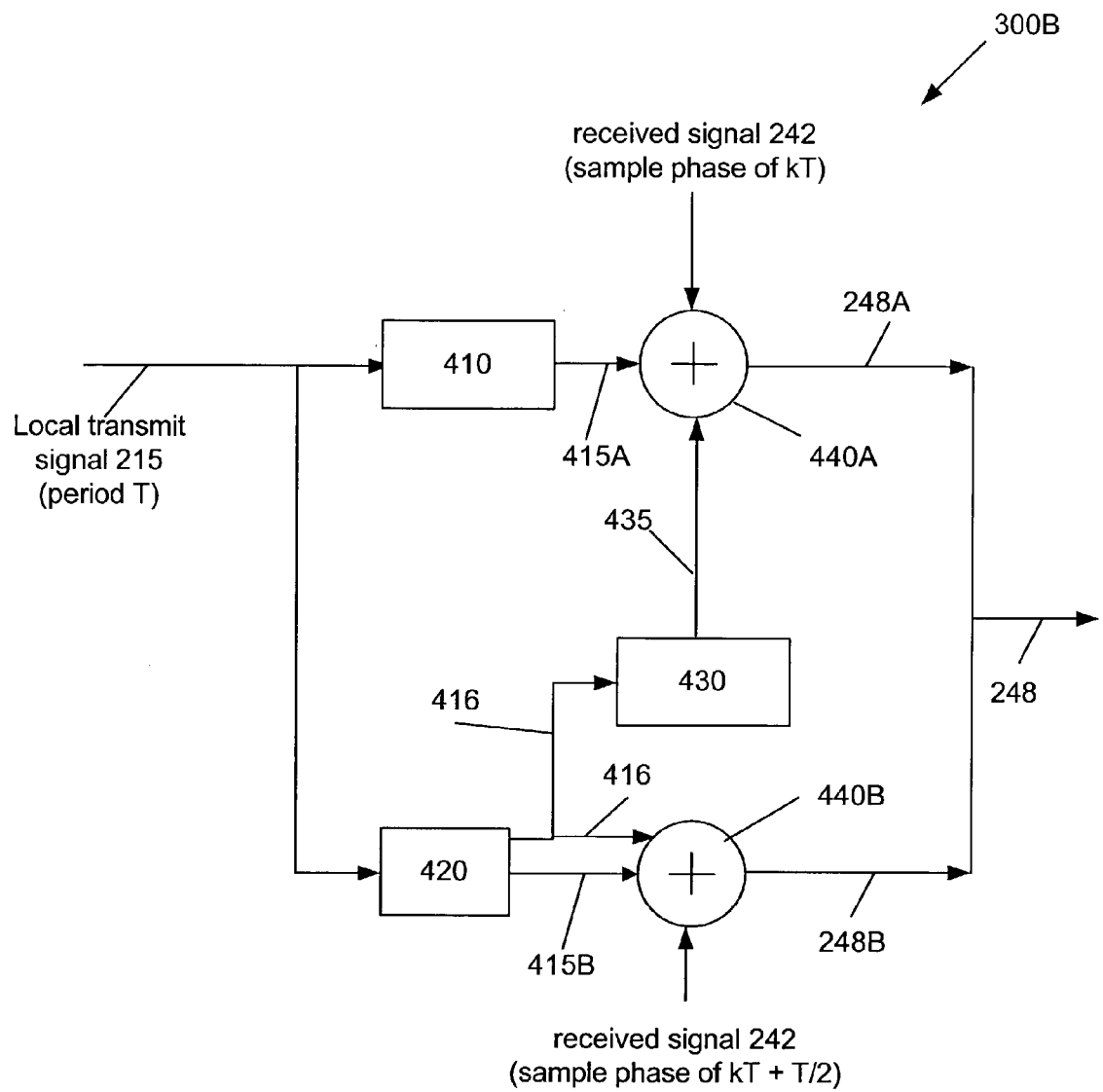
FIG. 3B depicts in block diagram form an echo canceller, in accordance with embodiment of the present invention.

FIG. 3B depicts in block diagram form an echo canceller 300B, in accordance with an embodiment of the present invention. Echo canceller 300B may include a first body echo canceller (EC0''') 410, echo canceller (EC1''') 420, interpolator 430, and summers 440A and 440B. Echo canceller 300B may be implemented, in whole or in part, as software executed by a digital signal processor or a central processing unit (CPU) for example as used by a modem or personal computer. Echo canceller 300B may be implemented, in whole or in part, as firmware, an application specific integrated circuit (ASIC), and/or a field programmable gate array (FPGA).

EC0''' 410 may generate body echo cancellation signal 415A to reduce body noise among received signal 242 that may be attributed to transmit signal 215. Body echo cancellation signal 415A may have phases of kT. In some implementations, when one twisted pair wire is used to receive and transmit signals, transmit signal 215 may introduce echo noise into received signal 242. From received signal 242, body echo cancellation signal 415A may remove echo body noise attributable to transmit signal 215. In one embodiment, EC0''' 410 may be implemented as an adaptive digital multiple tap FIR filter.

EC1''' 420 may generate body echo cancellation signal 415B and tail echo cancellation signal 416 (each having phases of kT+T/2) to reduce respective body and tail noise in received signal 242. Such body and tail noise in received signal 242 may be attributable to transmit signal 215.

Based upon the tail echo cancellation signal 416, interpolator 430 may determine and provide an interpolated tail echo cancellation signal 435 (having phases of kT) to summer 440A. In one embodiment, interpolator 430 may perform linear interpolations based upon tail echo cancellation signal 416 (having phases of kT+T/2) to determine interpolated tail echo cancellation signal 435 having phases of kT. Interpolator 430 may be implemented as a two or more tap linear FIR filter although other linear averaging devices may be used.

For example, in some implementations, interpolator 430 may use the following relationship to determine interpolated tail echo cancellation signal 435:

$$\text{Sample}(x)*W+(\text{sample}(x+1)*(1-W)$$

where
Sample(x) is a sample of tail echo cancellation signal 416; and
Sample(x+1) is a next consecutive sample of tail echo cancellation signal 416 following sample(x).

In some implementations, variable W may be 0.5 although other values may be chosen.

To remove a body portion of echo noise attributable to transmit signal 215, EC0''' 410 and EC1''' 420 may delay output of body echo cancellation signals 415A and 415B so that, in the time domain, body echo cancellation signals 415A and 415B are applied to the received signal 242 to cancel body noise attributable to a relevant portion of transmit signal 215. Similarly, to remove a tail portion of echo noise attributable to transmit signal 215, EC1''' 420 and interpolator 430 may delay output of respective tail echo cancellation signals 416 and interpolated tail echo cancellation signal 435 to respective summers 440A and 440B so that, in the time domain, tail echo cancellation signals 416 and interpolated tail echo cancellation signal 435 are applied to the received signal 242 to cancel tail echo noise attributable to a relevant portion of transmit signal 215.

For phases of kT, summer 440A may (1) subtract body echo cancellation signal 415A and tail echo cancellation signal 435 from received signal 242 and (2) provide the result as signal 248A. For phases of kT+T/2, summer 440B may (1) subtract body echo cancellation signal 415B and tail echo cancellation signal 416 from received signal 242 and (2) provide the result as signal 248B. Signals 248A and 248B together combine to form echo reduced signal 248.

For example, for echo that includes a body portion having a duration of 1 microseconds and a tail of 3 microseconds, each of EC0 110 and EC1 120 of the echo canceller of FIG. 1B may sample echo for 4 microseconds. By contrast, for echo canceller 300B, EC0''' 410 may sample the body portions of echo for, e.g., 1 microsecond whereas EC1''' 420 may sample the body and tail portions of echo for, e.g., 4 microseconds. Cumulatively, echo canceller 300B may sample echo for 5 microseconds, whereas the echo canceller of FIG. 1B may sample echo for 8 microseconds. In some embodiments of the present invention, when FIR filters are used, the number of taps of FIR filters used in the echo canceller of FIG. 1B and echo canceller 300B may be proportional to the time in which an FIR filter samples echo. Accordingly, the echo canceller 300B may use less taps than the echo canceller of FIG. 1B. By using less filter taps, echo canceller 300B may thereby use less die space than the canceller described with respect to FIG. 1B.

The drawings and the foregoing description gave examples of the present invention. The scope of the present invention, however, is by no means limited by these specific examples. Numerous variation whether explicitly given in the specification or not, such as differences in structure, dimension, and use of material, are possible. The scope of the invention is at least as broad as given by the following claims.

What is claimed is:

1. A method comprising:
   determining a body echo cancellation signal;
   determining a tail echo cancellation signal sampled at a first phase;
   determining a second tail echo cancellation signal sampled at a second phase and based on the tail echo cancellation signal, wherein the determining the second tail echo cancellation signal comprises interpolating values based on the tail echo cancellation signal and wherein the interpolating comprises performing weighted averaging of consecutive sample values of the tail echo cancellation signal; and
   determining a third tail echo cancellation signal sampled at a third phase and based on the tail echo cancellation signal, wherein the first, second, and third sample phases are different.

2. The method of claim 1, wherein the determining the third tail echo cancellation signal comprises:
   interpolating values based on the tail echo cancellation signal.

3. The method of claim 2, wherein the interpolating values of the third tail echo cancellation signal comprises performing weighted averaging of consecutive sample values of the tail echo cancellation signal.

4. The method of claim 1, wherein the determining the body echo cancellation signal comprises:
   determining a second body echo cancellation signal sampled at a phase approximately equal to the second phase; and
   determining a third body echo cancellation signal sampled at a phase approximately equal to the third phase.

5. The method of claim 1 further comprising:
   reducing tail echo in a received signal based upon the second and third tail echo cancellation signals.

6. The method of claim 1 further comprising:
   reducing echo in a received signal based upon the body echo cancellation signal, second tail echo cancellation signal, and third tail echo cancellation signal.

7. A method comprising:
   determining a body echo cancellation signal;
   determining a tail echo cancellation signal sampled at a first phase; and
   determining a second tail echo cancellation signal sampled at a second phase and based upon the tail echo cancellation signal, wherein the first and second sample phases are different, wherein the determining the second tail echo cancellation signal comprises interpolating values based on the tail echo cancellation signal, and wherein the interpolating comprises performing weighted averaging of consecutive sample values of the tail echo cancellation signal.

8. The method of claim 7, wherein the determining the body echo cancellation signal comprises:

determining a second body echo cancellation signal sampled at a phase approximately equal to the first phase; and determining a third body echo cancellation signal sampled at a phase approximately equal to the second phase.

9. The method of claim 7 further comprising:

reducing tail echo in a received signal based upon the tail echo cancellation and the second tail echo cancellation signal.

10. The method of claim 7 further comprising:

reducing echo in a received signal based upon the body echo cancellation signal, the tail echo cancellation signal, and the second tail echo cancellation signal.

11. An apparatus comprising:

a body echo cancellation logic to provide first and second body echo cancellation signals;

a first tail echo cancellation logic to provide a first tail echo cancellation signal sampled at a first phase;

a first interpolation logic to provide a second tail echo cancellation signal sampled at a second phase and based on the first tail echo cancellation signal;

a second interpolation logic to provide a third tail echo cancellation signal sampled at a third phase and based on the first tail echo cancellation signal, wherein the first, second, and third sample phases are different; and logic to reduce echo in a received signal based on the first and second body echo cancellation signals and second and third tail echo cancellation signals.

12. The apparatus of claim 11, wherein the first body echo cancellation signal is sampled at a phase approximately equal to the second phase.

13. The apparatus of claim 11, wherein the second body echo cancellation signal is sampled at a phase approximately equal to the third phase.

14. The apparatus of claim 11, wherein the body echo cancellation logic comprises a finite impulse response filter.

15. The apparatus of claim 11, wherein the first tail echo cancellation logic comprises a finite impulse response filter.

16. The apparatus of claim 11, wherein the first interpolation logic comprises a finite impulse response filter.

17. The apparatus of claim 11, wherein the second interpolation logic comprises a finite impulse response filter.

18. The apparatus of claim 11, wherein the first interpolation logic comprises logic to perform weighted averaging of consecutive samples of the first tail echo cancellation signal.

19. The apparatus of claim 11, wherein the second interpolation logic comprises logic to perform weighted averaging of consecutive samples of the first tail echo cancellation signal.

20. The apparatus of claim 11, further comprising logic to reduce tail echo in a received signal based on the second and third tail echo cancellation signals.

21. An apparatus comprising:

a first body echo cancellation logic to provide a first body echo cancellation signal sampled at a first phase;

a second echo cancellation logic to provide a second body echo cancellation signal sampled a second phase and a first tail echo cancellation signal sampled at the second phase; and an interpolation logic to provide a second tail echo cancellation signal sampled at a phase approximately equal to the first phase and based on the first tail echo cancellation signal, wherein to provide the second tail echo cancellation signal the interpolation logic is to interpolate values based on the first tail echo cancellation signal and to interpolate, the interpolation logic is to perform weighted averaging of consecutive sample values of the first tail echo cancellation signal.

22. The apparatus of claim 21, wherein the first body echo cancellation logic comprises a finite impulse response filter.

23. The apparatus of claim 21, wherein the interpolation logic comprises a finite impulse response filter.

24. The apparatus of claim 21, further comprising logic to reduce echo in a received signal based on the first and second body echo cancellation signals and first and second tail echo cancellation signals.

25. The apparatus of claim 21, further comprising logic to reduce tail echo in a received signal based on the first and second tail echo cancellation signals.

26. A system comprising:

a signal gate to transmit an output signal and to receive an input signal;

an echo canceller to receive the input signal and to receive the output signal, wherein the echo canceller comprises:

a body echo cancellation logic to provide first and second body echo cancellation signals, a first tail echo cancellation logic to provide a first tail echo cancellation signal sampled at a first phase, a first interpolation logic to provide a second tail echo cancellation signal sampled at a second phase and based on the first tail echo cancellation signal, and a second interpolation logic to provide a third tail echo cancellation signal sampled at a third phase and based on the first tail echo cancellation signal, wherein the first, second, and third phases are different; and a summer to reduce echo in the input signal based upon the first and second body echo cancellation signals and second and third tail echo cancellation signals.

27. The system of claim 26, wherein the signal gate uses a twisted pair line to connect to a far-end modem.

28. The system of claim 26, wherein the signal gate uses a coaxial cable to connect to a far-end modem.

29. The system of claim 26, wherein the signal gate uses an antenna to connect to a far-end modem.

30. The system of claim 26, further comprising an interface logic to receive the echo reduced signal.

31. A system comprising:

a signal gate to transmit an output signal and to receive an input signal;

an echo canceller to receive the input signal and to receive the output signal, wherein the echo canceller comprises:

a first body echo cancellation logic to provide a first body echo cancellation signal sampled at a first phase, a second echo cancellation logic to provide a second body echo cancellation signal sampled at a second phase and a first tail echo cancellation signal sampled at the second phase, and an interpolation logic to provide a second tail echo cancellation signal sampled at the first phase and based on the first tail echo cancellation signal; and a summer to reduce echo in the input signal based upon the first and second body echo cancellation signals and the first and second tail echo cancellation signals.

32. The system of claim 31, wherein the signal gate uses a twisted pair line to connect to a far-end modem.

33. The system of claim 31, wherein the signal gate uses a coaxial cable to connect to a far-end modem.

34. The system of claim 31, wherein the signal gate uses an antenna to connect to a far-end modem.

35. The system of claim 31, further comprising an interface logic to receive the echo reduced signal.

36. An article comprising a machine readable storage medium to store instructions, that when executed, instruct a machine to:
- determine a body echo cancellation signal;
- determine a tail echo cancellation signal sampled at a first phase;
- determine a second tail echo cancellation signal sampled at a second phase and based on the tail echo cancellation signal;
- determine a third tail echo cancellation signal sampled at a third phase and based on the tail echo cancellation signal, wherein the first, second, and third sample phases are different, wherein the instruction to determine the body echo cancellation signal further comprises instructions to:
- determine a second body echo cancellation signal sampled at a phase approximately equal to the second phase, and
- determine a third body echo cancellation signal sampled at a phase approximately equal to the third phase.

37. An article comprising a machine readable storage medium to store instructions, that when executed, instruct a machine to:
- determine a body echo cancellation signal;
- determine a tail echo cancellation signal sampled at a first phase; and
- determine a second tail echo cancellation signal sampled at a second phase and based upon the tail echo cancellation signal, wherein the first and second sample phases are different, wherein instructions to determine the second tail echo cancellation signal comprises instructions to:
- perform weighted averaging of consecutive samples of the tail echo cancellation signal.

* * * * *